(12) United States Patent
Nemoto et al.

(10) Patent No.: US 7,321,486 B2
(45) Date of Patent: Jan. 22, 2008

(54) ELECTRIC DOUBLE LAYER CAPACITOR

(75) Inventors: Masaaki Nemoto, Kyoto (JP); Koji Endo, Hirakata (JP); Kikuko Kato, Hirakata (JP); Yasuo Nakahara, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/700,833

(22) Filed: Jan. 31, 2007

(65) Prior Publication Data

US 2007/0274024 A1    Nov. 29, 2007

(30) Foreign Application Priority Data

Mar. 31, 2006    (JP) .............................. 2006-097092

(51) Int. Cl.
*H01G 9/155*   (2006.01)
*H01G 4/008*   (2006.01)
*H01G 9/00*    (2006.01)

(52) U.S. Cl. ...................... 361/305; 361/502; 361/533

(58) Field of Classification Search ................ 361/305, 361/502, 533
See application file for complete search history.

(56) References Cited

U.S. PATENT DOCUMENTS 3,700,975 A * 10/1972 Butherus et al. ............ 361/502
5,733,661 A * 3/1998 Ue et al. .................... 428/426
2002/0096661 A1* 7/2002 Shinozaki et al. .......... 252/500
2007/0177333 A1* 8/2007 Umemoto et al. .......... 361/502
2007/0228507 A1* 10/2007 Endo et al. ................. 257/499

* cited by examiner

*Primary Examiner*—Evan Pert
(74) *Attorney, Agent, or Firm*—Masuvalley & Partners

(57) ABSTRACT

The present invention provides an electric double layer capacitor that has less chance for internal resistance increase. For this objective, in this electric double layer capacitor, an electric double layer capacitor element sandwiches a separator between a cathode and an anode, arranged inside a container comprising a lid and a concave shaped containing portion. On the inner bottom face in the containing portion, an insulating layer having a first conductive layer connected to a connecting terminal, and an opening portion penetrates to the first conductive layer are formed, wherein a second conductive layer fills inside the opening portion. Onto the insulating layer and the second conductive layer, a third conductive layer which laminates a first layer comprised of aluminum and a second layer comprised of carbon, is formed and connected to the cathode. The fourth conductive layer is connected to the anode, and also connected to the connecting terminal.

9 Claims, 3 Drawing Sheets

ELECTRIC DOUBLE LAYER CAPACITOR

TECHNICAL FIELD

The present invention relates to an electric double layer capacitor.

BACKGROUND OF INVENTION

Conventionally, an electric double layer capacitor has been proposed, the electric double layer capacitor is mountable on the surface of a printed wiring board of a mobile phone and so on. An example of such technology is described in the Japanese published unexamined patent application no. 2005-210064.

FIG. 3 is a cross-section diagram to explain the configuration of a conventional electric double layer capacitor. The conventional electric double layer capacitor is hereafter explained in reference to FIG. 3.

In the conventional electric double layer capacitor, as shown in FIG. 3, an electric double layer capacitor element 102, which sandwiches a separator 102c between a cathode 102a and an anode 102b, is arranged inside a sealed container 101 comprising a lid 101a and a concaved containing portion 101b comprised of ceramics, such as alumina.

On the inner bottom face of the containing portion 101b, a first conductive layer 103 comprised of a tungsten is formed, and a insulating layer 104 comprised of ceramics, such as alumina, is further formed and covers the first conductive layer 103. On the insulating layer 104, an opening portion 104a, which reaches from the surface of insulating layer 104 to the first conductive layer 103, is formed, and a second conductive layer 105 comprised of a valve metal, such as aluminum, or a carbon is formed on the first conductive layer 103 inside the opening portion 104a. A conductive adhesive 107 is formed on the insulating layer 104 and the second conductive layer 105, and a cathode 102a is connected to the second conductive layer 105 through the conductive adhesive 107. Also, the first conductive layer 103 penetrates through the side wall of the containing portion 101b, and is connected to a connecting terminal 108 that reaches from the side face to the lower face of the containing portion 101b.

A conductive adhesive 109 is formed on the anode 102b, and the anode 102b is connected to a forth conductive layer 110 comprised of gold and nickel formed on the lower face of lid 101a through the conductive property adhesive 109. Also, the fourth conductive layer 110 extends between the lid 101a and the container portion 101b, and is connected to a connecting terminal 111 that reaches from the side face to the lower face of the containing portion 101b.

Also, the inside a container 101 is filled with electrolytic solution (not shown) to sufficiently impregnate the cathode 102a and anode 102b. In this way, the conventional electric double layer capacitor is configured.

In the conventional electric double layer capacitor, the first conductive layer 103 comprised of tungsten is likely to undergo an anode corrosion, thus the first conductive layer 103 is coated with the insulating layer 104 comprised of ceramic to inhibit the corrosion. Also, by filling the second conductive layer 105 that connects the first conductive layer 103 with the cathode 102a inside the opening portion 104a of insulating layer 104, the first conductive layer 103 is not exposed to the electrolytic solution. Further, in the conventional electric double layer capacitor, the second conductive layer 105 is comprised of a valve metal, such as aluminum, or a carbon which are anode corrosion inhibiting. Consequently, in the conventional electric double layer capacitor, the second conductive layer 105 and the first conductive layer 103 are hard to dissolve even when a high voltage of approximately 3V is applied to the cathode.

However, in the conventional electric double layer capacitor described above, due to an occurrence of cracks on the second conductive layer 105 comprised of the valve metal, such as aluminum, or carbon, and occurrence of gaps between the opening portion 104a and the second conductive layer 105 when heated by processes, such as reflow soldering, there are problems of a penetration of the electrolytic solution into such cracks or gaps. In this case, there is an issue of an increase in internal resistance for the conventional electric double layer capacitor described above because a contact failure due to anode corrosion is prone to occur in the first conductive layer 103.

The present invention is made to solve issues as described above, and one of the objectives for the present invention is to provide an electric double layer capacitor whose internal resistance is less likely to increase.

BRIEF SUMMARY OF THE INVENTION

In order to achieve the above objective, for a first embodiment of the present invention, an electric double layer capacitor is provided with a container having a lid and a containing portion comprised of an insulating property material, an electric double layer capacitor element having a first electrode and a second electrode arranged to face each other in the container through a separator, an electrolytic solution filled in the container, wherein the containing portion includes a first conductive layer formed on the inner face of the containing portion, an insulating layer formed to cover the first conductive layer, an opening portion reaching from the surface of the insulating layer to the first conductive layer, a second conductive layer formed to fill inside the opening portion, and a third conductive layer formed on the insulating layer and the second conductive layer and is electrically connected to the first electrode, wherein the third conductive layer has a first layer including a valve metal formed on the insulating layer and the second conductive layer, and a second layer formed on the first layer and comprised of carbon.

In the electric double layer capacitor described above, progression of the anode corrosion into the inside of the third conductive layer is inhibited because the second layer comprised of carbon is formed on the first electrode side of the third conductive layer. Further, the first layer containing a valve metal is formed on the insulating layer side of the third conductive layer, thus a passivation film is formed on the first layer and progression of corrosion can be prevented even when a crack or separation occurs to the second layer, a surface layer of third conductive layer, comprised of carbon.

Consequently, penetration of the electrolytic solution from the interface of the opening portion of the insulating layer and the second conductive layer can be inhibited, thereby anode corrosion of the first conductive layer can be inhibited. Therefore, an electric double layer capacitor that has less chance for an increase of the internal resistance can be obtained because disconnection or contact failure is less likely to occur in the electrical pass from the first electrode to the first conductive layer.

A second embodiment of the present invention is provided with a container having a lid and a containing portion comprised of insulating material, an electric double layer capacitor element having a first electrode and a second electrode arranged to face each other in the container through a separator, and electrolytic solution filled in the container, wherein the containing portion includes a first conductive layer formed on the inner face of the containing portion, an insulating layer comprised of ceramics formed to cover the first conductive layer, an opening portion reaching from the surface of the insulating layer to the first conductive layer, a second conductive layer formed to fill inside the opening portion, and a third conductive layer formed on the insulating layer and the second conductive layer and is electrically connected to the first electrode, wherein the third conductive layer has a first layer comprised of a material formed on the insulating layer and the second conductive layer with a linear coefficient of expansion in a range of $2 \times 10^{-6}$/□ to $7.3 \times 10^{-6}$/□, and a second layer comprised of carbon formed on the first layer. In addition, an average between approximately 0□ and approximately 100□ is used as a liner coefficient of expansion mentioned above and below.

In the electric double layer capacitor of this invention, a second layer comprised of carbon is configured on the first electrode side of the third conductive layer, thereby progression of the anode corrosion into the third conductive layer can be inhibited. Further, since the linear coefficient of expansion for the first layer is between $2 \times 10^{-6}$° C. and $7.3 \times 10^{-6}$/° C., which is equivalent to that of the insulating layer comprised of ceramics, thus thermal expansion of the first layer may be conformed to that of the insulating layer comprised of ceramics during thermal treatment, such as reflow solder. This inhibits separation of the third conductive layer from the insulating layer.

Consequently, the penetration of the electrolytic solution from the interface of the opening of the insulating layer and the second conductive layer can be inhibited, thereby anode corrosion of the first conductive layer can be inhibited. Therefore, an electric double layer capacitor that has less chance for an increase of the internal resistance can be obtained because disconnection or contact failure is less likely to occur in the electrical pass from the first electrode to the first conductive layer.

In the first and second embodiments described above, the first layer preferably contains the constituent element of the insulating layer described above. By configuring in such a way, an adhesiveness of the first layer with the insulating layer improves, thereby separation of the third conductive layer from the insulating layer can be inhibited. This can further inhibit the penetration of the electrolytic solution from the interface of the opening portion of the insulating layer and the second conductive layer. Also, this first layer may be formed by the spattering method (i.e. sputtering).

A third embodiment of the present invention is provided with a container having a lid and a containing portion comprised of insulating material, an electric double layer capacitor element having a first electrode and a second electrode arranged to face each other in the container through a separator, and electrolytic solution filled in the container, wherein the containing portion includes a first conductive layer formed on the inner face of the containing portion, an insulating layer formed to cover the first conductive layer, an opening portion reaching from the surface of the insulating layer to the first conductive layer, a second conductive layer formed to fill inside the opening portion, and a third conductive layer formed on the insulating layer and the second conductive layer and is electrically connected to the first electrode, wherein the third conductive layer having a first layer formed on the insulating layer and the second conductive layer and contains a constituent element of the insulating layer, and a second layer comprised of carbon is formed on the first layer.

In this third embodiment, the progression of anode corrosion into the third conductive layer is inhibited because the second layer comprised of carbon is formed on the first electrode side of the third conductive layer. Further, the first layer of the insulating layer side of the third conductive layer contains a constitute element of the insulating layer, thus the adhesiveness of the first layer with the insulating layer can be improved. This can inhibit the separation of the third conductive layer from the insulating layer.

Consequently, the penetration of the electrolytic solution from the interface of the opening portion of the insulating layer and the second conductive layer can be inhibited, thereby the anode corrosion of the first conductive layer can be inhibited. Therefore, an electric double layer capacitor that has less chance for an increase of the internal resistance can be obtained because disconnection or contact failure is less likely to occur in the electrical pass from the first electrode to the second conductive layer.

In the third embodiment described above, preferably, the insulating layer is comprised of ceramics and the first layer is comprised of a material with a linear coefficient of expansion in a range of $2 \times 10^{-6}$/° C. to $7.3 \times 10^{-6}$/° C. By configuring this way, the linear coefficient of expansion for first layer is between $2 \times 10^{-6}$/° C. to $7.3 \times 10^{-6}$/° C. which is comparative to that of ceramics, the linear coefficient of expansion for the first layer can be made comparable to that of the insulating layer comprised of ceramics during thermal treatment, such as reflow solder. This can inhibit the separation of the third conductive layer from the insulating layer. Consequently, the penetration of the electrolytic solution from the interface of the opening portion of the insulating layer and the second conductive layer can further be inhibited. Also, the first layer may be formed by the spattering method.

The fourth embodiment of the current invention is provided with a container having a lid and a containing portion comprised of insulating property material, an electric double layer capacitor element having a first electrode and a second electrode arranged to face each other in the container through a separator, and electrolytic solution filled in the container, wherein the containing portion includes a first conductive layer formed on the inner face of the containing portion, an insulating layer formed to cover the first conductive layer, an opening portion reaching from the surface of the insulating layer to the first conductive layer, a second conductive layer formed to fill inside the opening portion, and a third conductive layer formed on the insulating layer and the second conductive layer and is electrically connected to the first electrode, wherein the third conductive layer has a first layer which contains an aluminum, formed on the insulating layer and the second conductive layer, and a second layer comprised of carbon formed on the first layer.

And, in the first to fourth embodiments described above, the first layer is preferably formed by the spattering method. By configuring this way, the first layer can be in a dense thin film as well as a thin film that evenly coats the interface of the opening portion of the insulating layer and the second conductive layer. Consequently, the penetration of the electrolytic solution from the interface of the opening portion of the insulating layer and the second conductive layer can further be inhibited.

DETAILED DESCRIPTION OF THE INVENTION

Embodiments of the present invention are hereinafter explained in reference to the figures.

Embodiment 1

Figure 1:
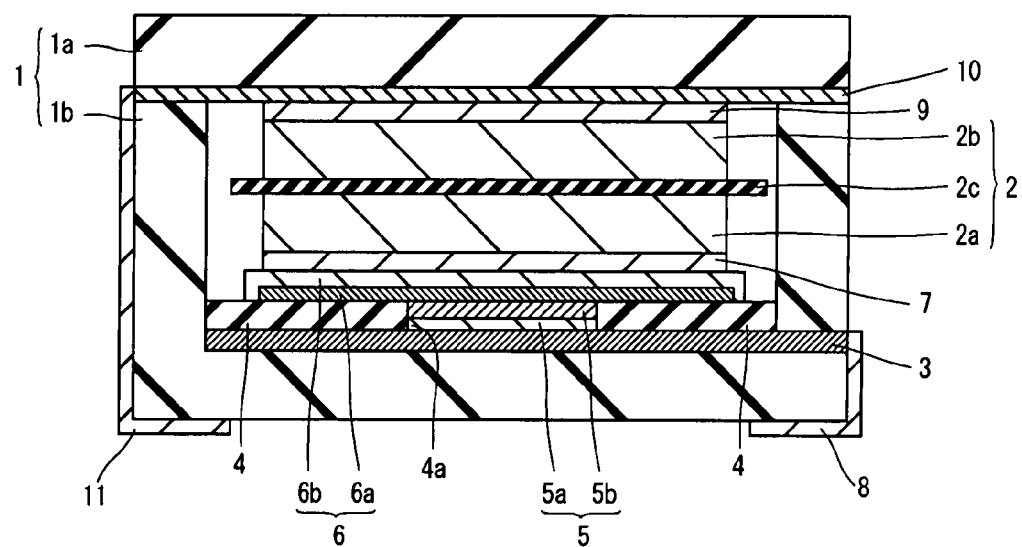
FIG. 1 is a cross-sectional diagram to explain the configuration of an electric double layer capacitor according to embodiment 1 of the present invention.
Figure 2:
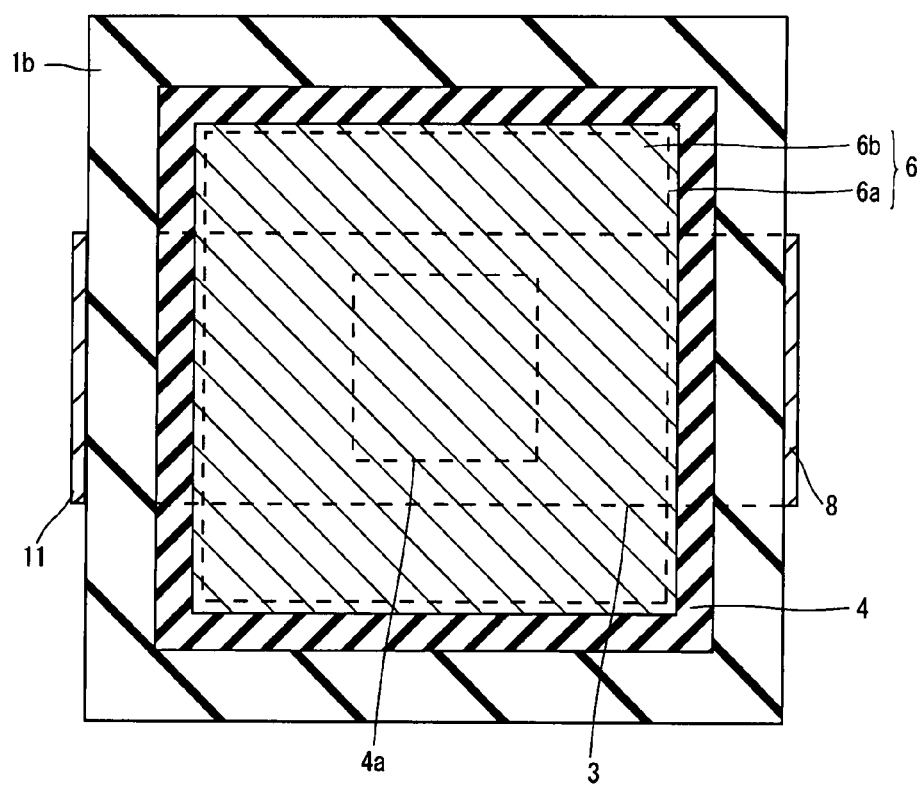
FIG. 2 is an upper view of a container portion in concaved form for an electric double layer capacitor according to embodiment 1 of the present invention.
Figure 3:
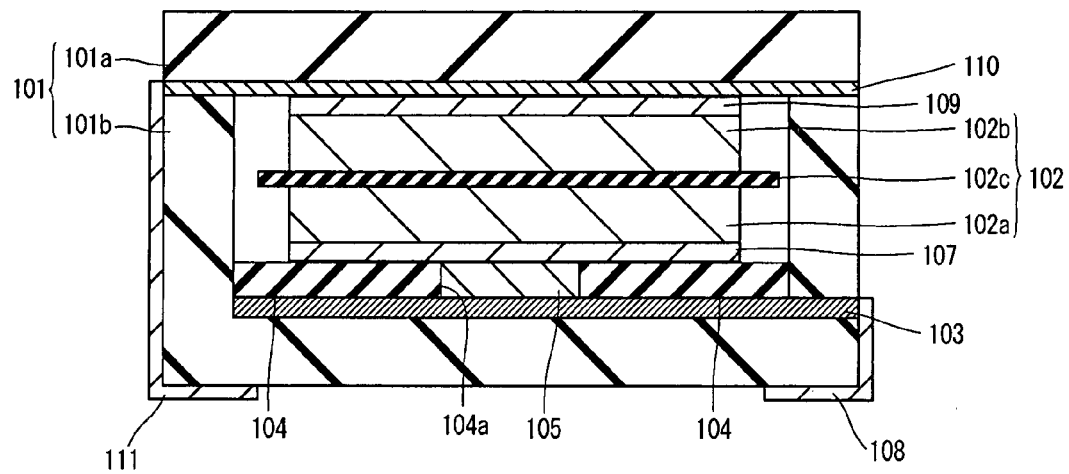
FIG. 3 is a cross-section diagram to explain the configuration of a conventional electric double layer capacitor.

FIG. 1 is a cross-sectional diagram to explain the configuration of an electric double layer capacitor according to embodiment 1 of the present invention. FIG. 2 is an upper view of a container portion in concaved form for an electric double layer capacitor according to embodiment 1 of the present invention. The configuration of the electric double layer capacitor according to embodiment 1 of the present invention is hereinafter explained in reference to FIGS. 1 and 2.

In the electric double layer capacitor of the embodiment 1 of the present invention, as shown in FIG. 1, an electric double layer capacitor element 2 sandwiches a separator 2c comprised of glass fiber between a cathode 2a and an anode 2b, is arranged inside a container 1 having a lid 1a comprised of kovar (which is comprised of cobalt: approximately 17 wt %, nickel: approximately 29 wt %, the rest: iron) and a containing portion 1b in a concaved form comprised of alumina. In addition, the cathode 2a and the anode 2b are examples of a "first electrode" and a "second electrode" of the present invention respectively.

The container 1 is in a rectangular solid shape with approximately 5 mm on a side and approximately a 1.5 mm height, and a concave portion with approximately 3.6 mm on a side and approximately a 1.1 mm depth is formed on the containing portion 1b. The containing portion 1b is formed by firing a compact in which are layered a plurality of ceramic green sheets (comprising an unburned ceramic material in a sheet form) having a thickness of approximately 0.4 mm.

Each of the cathode 2a and the anode 2b has a size of approximately 3 mm square by approximately 0.5 mm, and comprised of activated carbon powder combined approximately 10 wt % of acetylene black and approximately 10 wt % of polytetrafluoroethylene. The specific surface of the activated carbon powder is approximately 2000 m$^2$/g.

Also, referring to FIG. 2, the first conducting layer 3 having a width of approximately 1.5 mm comprised of tungsten is formed on the bottom face of the inner portion of the containing portion 1b, and the insulating layer 4 having a thickness of approximately 5 μm comprised of alumina is formed to cover the first conducting layer 3. The conductive layer 3 is formed by firing the green sheet applied with a tungsten paste simultaneously with the above mentioned ceramic green sheets when forming the containing portion 1b. On the insulating layer 4, a square shaped opening portion 4a approximately 500 μm on a side, which penetrates through the first conductive layer 3, is formed on the center of the inner bottom face of the container portion 1b.

In addition, the insulating layer 4 and the opening portion 4a are formed by applying an alumina paste, covering the first conductive layer 3 on the inner bottom face of the containing portion, leaving the opening portion 4a above uncovered, and firing the paste.

Onto the first conductive layer inside the opening portion 4a, a second conductive layer 5 having a laminated structure comprising a lower layer 5a comprised of nickel in a thickness of approximately 4.5 μm, and an upper layer 5b comprised of gold formed on the first layer 5a in a thickness of approximately 0.5 μm, is formed so that the inside of the opening portion is filled. Each of the lower layer 5a and the upper layer 5b is formed by plating.

A third conductive layer 6 is formed on the insulating layer 4 and the second conductive layer 5, the third conducive layer 6 has a laminated structure comprising a first layer 6a comprised of aluminum in a thickness of approximately 1.0 μm, and a second layer 6b, which is formed so that it covers the first layer 6a, comprised of carbon in a thickness of approximately 0.2 μm. In addition, the aluminum is an example of a "valve metal" in the present invention. By the DC spattering method, each of first layer 6a and second layer 6b is formed by spattering aluminum and carbon, respectively with Ar gas.

On the third conducting layer 6, a conductive property adhesive 7 comprised of carbon powder and organic binder is applied and formed, thereby the cathode 2a and the third conductive layer 6 are connected through the conductive adhesive 7. In addition, the third conductive layer 6 and the conductive adhesive 7 have a larger area than the cathode 2a in order to contact with the whole area of cathode 2a.

Also, the first conductive layer 3 penetrates through the side wall of the containing portion 1b and is connected to the connecting terminal 8 formed across from the side face to the lower face of containing portion 1b. Further, the connecting terminal 8 has a laminated structure on the containing portion 1b in the order of a tungsten layer in a thickness of approximately 15 μm, a nickel layer in a thickness of approximately 10 μm, and a gold layer in a thickness of approximately 0.5 μm.

On the anode 2b, a conductive adhesive 9, comprised of carbon powder and organic binder, is applied and formed, and a forth conductive layer 10, comprised of gold in a thickness of approximately 0.5 μm is formed on the lower face of anode 2b and lid 1b, and is connected through the conductive property adhesive 9. Also, the fourth conductive layer 10 extends between the lid 1a and the containing portion 1b, and is connected to the connecting terminal 11 formed across from the side face to the lower face of the containing portion 1b. The connecting terminal 11 has a laminated structure on the containing portion 1b, in the order of a tungsten layer having a thickness of approximately 15 μm, a nickel layer having a thickness of approximately 10 μm, and a gold layer having a thickness of approximately 0.5 μm.

Also, inside the container 1 is filled with electrolytic solution (not shown) which is formed by dissolving $(C_2H_5)_4NBF_4$ in approximately 1 mol/liter concentration into a solvent, polypropylenecarbonate, to sufficiently soak the cathode 2a and the anode 2b. Also, the lid 1a and the container portion 1b are sealed by seam welding through a seal ring (not shown) formed on the edge portion of the open end of the container portion 1b. In this way, the electric double layer capacitor of the embodiment 1 is configured.

In the embodiment 1, the second layer 6b, the surface layer of third conductive layer 6, is comprised of carbon, thus progression of anode corrosion into the third conductive layer 6 can be inhibited. Further, the first layer 6a of the third conductive layer contains a valve metal, thus a passive film is formed on the first layer 6a and inhibits the anode corrosion even when a crack or separation occurs to the second layer 6b. As a result, the penetration of the electrolytic solution from the interface of the opening portion 4a of the insulating layer 4 and the second conductive layer 5 can be inhibited, thus the anode corrosion of the first conductive layer 3 can be inhibited. Therefore, an electric double layer capacitor that has less chance for increase of the internal resistance can be obtained because disconnection or contact failure is less likely to occur in the electrical pass from the cathode 2a to the first conductive layer 3.

Also in the embodiment 1, adhesiveness of the first layer 6a with the insulating layer 4 is increased because the first layer 6a contains a constituent element (aluminum) of the insulating layer 4 comprised of alumina. This inhibits separation of the third conductive layer 6 from the insulating layer 4, thereby the penetration of the electrolytic solution from the interface of the opening portion 4a of the insulating layer 4 and second conductive layer 5 can further be inhibited.

Also in the embodiment 1, anode corrosion of the first layer 6a can further be inhibited because the second layer 6b comprised of carbon is formed to cover the first layer 6a.

Embodiment 2

As an embodiment 2, an electric double layer capacitor which has a similar structure to that of embodiment 1 was fabricated, except that the first layer 6a was formed with tungsten, instead of aluminum in the embodiment 1 above. In addition, the tungsten is an example of a "valve metal" of the present invention, and its linear coefficient of expansion is approximately $4.5 \times 10^{-6}/°$ C.

Embodiment 3

As an embodiment 3, an electric double layer capacitor which has a similar construction to that of embodiment 1 was fabricated, except that the first layer 6a was formed with zirconium, instead of aluminum in the embodiment 1 above. In addition, the zirconium is an example of a "valve metal" of the present invention, and its linear coefficient of expansion is approximately $5.9 \times 10^{-6}/°$ C.

Embodiment 4

As an embodiment 4, an electric double layer capacitor which has a similar construction to that of embodiment 1 was fabricated, except that the first layer 6a was formed with tantalum, instead of aluminum in the embodiment 1 above. In addition, the tantalum is an example of a "valve metal" of the present invention, and its linear coefficient of expansion is approximately $6.5 \times 10^{-6}/°$ C.

Embodiment 5

As an embodiment 5, an electric double layer capacitor which has a similar structure to that of embodiment 1 was fabricated, except the first layer 6a was formed with niobium, instead of aluminum in the embodiment 1 above. In addition, the niobium is an example of a "valve metal" of the present invention, and its linear coefficient of expansion is approximately $7.2 \times 10^{-6}/°$ C.

Embodiment 6

As an embodiment 6, an electric double layer capacitor which has a similar construction to that of embodiment 1 was fabricated, except that the first layer 6a was formed with titanium, instead of aluminum in the embodiment 1 above. In addition, the titanium is an example of a "valve metal" of the present invention, and its linear coefficient of expansion is approximately $8.9 \times 10^{-6}/°$ C.

Further, in the embodiments 2-6, each of the linear coefficients of expansion for the first layer 6a are comparative to the linear coefficients of expansion for the alumina that comprises the insulating layer 4, thus separation of the third conductive layer from the insulating layer 4 can further be inhibited during thermal treatment, such as the reflow soldering process. As a result, the penetration of the electrolytic solution from the interface of the opening portion 4a of the insulating layer 4 and the second conductive layer 5 can be inhibited, thereby the anode corrosion of the first conductive layer 3 can be inhibited.

Embodiment 7

As an embodiment 7, an electric double layer capacitor which has a similar construction to that of embodiment 1 was fabricated, except the first layer 6a was formed with molybdenum, instead of aluminum in the embodiment 1 above. In addition, the linear coefficient of expansion for the molybdenum is approximately $5.1 \times 10^{-6}/°$ C.

Embodiment 8

As an embodiment 8, an electric double layer capacitor which has a similar construction to that of embodiment 1 was fabricated, except that the first layer 6a was formed with chromium, instead of aluminum in the embodiment 1 above. In addition, the linear coefficient of expansion for the chromium is approximately $6.5 \times 10^{-6}/°$ C.

Embodiment 9

As an embodiment 9, an electric double layer capacitor which has a similar construction to that of embodiment 1 was fabricated, except that the first layer 6a was formed with kovar (which is comprised of cobalt: approximately 17 wt %, nickel: approximately 29 wt %, the rest: iron), instead of aluminum in the embodiment 1 above. In addition, the linear coefficient of expansion for the kovar is approximately $5.0 \times 10^{-6}/°$ C.

In embodiments 7-9, the second layer 6b, a surface layer of the third conductive layer 6, is comprised of carbon, thereby progression of anode corrosion into the third conductive layer 6 can be inhibited. Further, each of the linear coefficients of expansion for the first layer 6a is comparative to the linear coefficients of expansion for the alumina that comprises the insulating layer 4, thus separation of the third conductive layer from the insulating layer can further be inhibited during thermal treatment, such as the reflow soldering process. As a result, the penetration of the electrolytic solution from the interface of the opening portion 4a of the insulating layer 4 and second conductive layer 5 can be inhibited, thereby anode corrosion of the first conductive layer 3 can be inhibited.

Embodiment 10

As an embodiment 10, an electric double layer capacitor which has a similar construction to that of embodiment 1 was fabricated, except that the first layer 6a was formed with aluminum-chromium alloy (comprised of chromium: approximately 50 atomic %) instead of aluminum in the embodiment 1 above.

In embodiment 10, the second layer 6b, which is a surface layer of the third conductive layer 6 is comprised of carbon, thereby progression of anode corrosion into the third conductive layer 6 can be inhibited. Further, the first layer 6a contains a constituent element (aluminum) of the insulating layer 4 which is comprised of alumina, thus adhesiveness of the first layer 6a with the insulating layer 4 increases. This can inhibit the separation of the third conductive layer 6 from the insulating layer 4. As a result, the penetration of the electrolytic solution from the interface of the opening portion 4a of the insulating layer 4 and the second conductive layer 5 can be inhibited, thereby anode corrosion of the first conductive layer 3 can be inhibited.

Also in embodiment 10, each of the linear coefficients of expansion for the first layer 6a is comparative to the linear coefficients of expansion for the alumina that comprises the insulating layer 4, thus the separation of the third conductive layer from the insulating layer 4 can further be inhibited during thermal treatment, such as a reflow soldering process. As a result, the penetration of the electrolytic solution from the interface of the opening portion 4a of the insulating layer 4 and the second conductive layer 5 can be inhibited, thereby anode corrosion of the first conductive layer 3 can be inhibited.

Comparative Example 1

As a comparative example 1, an electric double layer capacitor which has a similar construction to that of embodiment 1 was fabricated, except that the first layer 6a was formed with gold instead of aluminum in the embodiment 1 above. In addition, the linear coefficient of expansion for the gold is approximately $14.1 \times 10^{-6}/°C$.

Next, the following evaluation has been made to confirm the effects of electric double layer capacitors according to each embodiment of the present invention.

First, a thermal test was conducted to each electric double layer capacitor in embodiment 1-10 and comparative example 1. The thermal test repeats three cycles of heating at approximately 260□ for approximately 1 minute after heating at approximately 170° C. for approximately 5 minutes. Subsequently, the discharge capacity is measured after continuously charging at approximately 3.3V for approximately 240 hours, by discharging down to approximately 2.0V at a constant current of approximately 2 mA. Further, in order to evaluate the internal resistance after this long term charge-discharge, an equivalent series resistance (ESR) is measured with a 4-terminal ohm meter at a frequency of approximately 1 kHz. The results are shown in table 1.

TABLE 1

| | First current collector layer | Liner coefficient of expansion $\times 10^{-6}/°C$. | ESR $\Omega$ | Discharge Capacity $\mu Ah$ |
|---|---|---|---|---|
| Embodiment 1 | Al | 23.5 | 87.1 | 16.3 |
| Embodiment 2 | W | 4.5 | 43.5 | 19.5 |
| Embodiment 3 | Zr | 5.9 | 46.6 | 19.0 |
| Embodiment 4 | Ta | 6.5 | 48.9 | 19.2 |
| Embodiment 5 | Nb | 7.2 | 49.0 | 19.3 |
| Embodiment 6 | Ti | 8.9 | 51.4 | 18.7 |
| Embodiment 7 | Mo | 5.1 | 47.3 | 19.2 |
| Embodiment 8 | Cr | 6.5 | 46.9 | 19.1 |
| Embodiment 9 | Fe—29Ni—17Co | 5.0 | 55.0 | 17.1 |
| Embodiment 10 | Al—50Cr | Unknown | 45.3 | 19.2 |
| Comparative example 1 | Au | 14.1 | 2014.6 | 4.3 |

As shown in table 1, in the comparative example 1, the ESR is significantly increased and the discharge capacity is decreased, due to corrosion of the first conductive layer, the second conductive layer, and the first layer, and deterioration of the electrolytic solution, both caused by the penetration of the electrolytic solution. On the contrary, all the electric double layer capacitors for embodiments 1-10 have a small ESR and a large service capacity. This feature is especially favorable when the first layer 6a is comprised of tungsten, zirconium, tantalum, niobium, molybdenum, and chromium.

In addition, the embodiments disclosed herein should be considered as examples in all respects, not as limitations. The scope of the present invention is indicated by the scope of the claims, not by the explanation of embodiments described above, and further, any meanings equivalent to the scope of the claims and all changes within the scope are included.

For example, in the embodiments 1-6 and 10 described above, the first layer 6a is comprised of a single valve metal, or an alloy of a valve metal and another type of metal, however, the present invention is not limited to this, it may be that an alloy contains two or more types of valve metals and an intermetallic compound, and alternatively, it may be a compound of a valve metal and a nonmetal material, such as $ZrB_2$, as long as it is comprised of a conductive material.

Also in the embodiments described above, the third conductive layer 6 is a 2-layer structure of first layer 6a and second layer 6b, however, the present invention is not limited to this, thus another layer may further be formed between the first layer 6a and the second layer 6b.

Further, in the embodiments described above, all the insulating layer 4 is comprised of alumina, however, the present invention is not limited to this, it may be formed with other ceramic materials, such as zirconia. At this time, if, for example, the insulating layer 4 is formed with zirconia, the first layer 6a is preferable to be comprised of a material that contains zirconia to contain the same constituent element, and further the containing portion 1b is also preferable to be formed with zirconia.

Further, in the embodiment described above, the second conductive layer 5 is in a 2-layer structure of lower layer 5a and upper layer 5b, however, this invention is not limited to this and the second conductive layer 5 may be a single layer, or three or more layers.

Still further, in the embodiments described above, the second conductive layer 5 is comprised of a material different from the first layer 6a of the first conductive layer 3 and the third conductive layer 6, however, the present invention is not limited to this, it may be formed by using the same material as the first layer 6a of the first conductive layer 3 and the third conductive layer 6. If, for example, comprising the second conductive layer 5 with the same material as the first layer 6a of the third conductive layer 6, the first layer 6a of third conductive layer 6 and second conductive layer 5 can be formed simultaneously by forming the first layer 6a of the third conductive layer 6 onto the insulating layer 4 in a way that inside the opening portion 4a is filled.

What is claimed is:

1. An electric double layer capacitor comprising;
   a container having a lid and a containing portion comprised of an insulating material,
   an electric double layer capacitor element having a first electrode and a second electrode arranged to face each other inside of said container through a separator; and
   an electrolytic solution in said container;
   wherein said containing portion comprises;
   a first conductive layer formed on an inner face of said containing portion;
   an insulating layer formed to cover said first conductive layer;
   an opening portion that reaches from a surface of said insulating layer to said first conductive layer;
   a second conductive layer located inside of said opening portion; and
   a third conductive layer formed onto said insulating layer and said second conductive layer, and electrically connected to said first electrode;
   wherein said third conductive layer includes a first layer comprised of a valve metal formed on said insulating layer and said second conductive layer, and a second layer comprised of carbon formed on said first conductive layer.

2. An electric double layer capacitor comprising;
   a container having a lid and a containing portion comprised of an insulating material,
   an electric double layer capacitor element having a first electrode and a second electrode arranged to face each other inside of said container through a separator; and
   an electrolytic solution in said container;
   wherein said containing portion contains a first conductive layer formed on the inner face of said containing portion;
   an insulating layer comprised of a ceramic formed to cover said first conductive layer;
   an opening portion that reaches from a surface of said insulating layer to said first conductive layer;
   a second conductive layer located inside of said opening portion; and
   a third conductive layer formed onto said insulating layer and said second conductive layer, and electrically connected to said first electrode;
   wherein said third conductive layer includes a first layer comprised of a material with a linear coefficient of expansion ranging between about $2\times10^{-6}/°$ C. and $7.3\times10^{-6}/°$ C. formed on said insulating layer and said second conductive layer, and a second layer comprised of a carbon formed on said first layer.

3. The electric double layer capacitor according claim 1 or 2, wherein said first layer contains a constituent element of said insulating layer.

4. The electric double layer capacitor according claim 3, wherein said first layer is formed by a spattering method.

5. An electric double layer capacitor comprising;
   a container having a lid and a containing portion comprised of an insulating material,
   an electric double layer capacitor element having a first electrode and a second electrode arranged to face each other inside of said container through a separator; and
   an electrolytic solution located in said container;
   wherein said containing portion contains a first conductive layer formed on an inner face of said containing portion;
   an insulating layer formed to cover said first conductive layer;
   an opening portion that reaches from a surface of said insulating layer to said first conductive layer;
   a second conductive layer formed to fill an inside of said opening portion; and
   a third conductive layer formed onto said insulating layer and said second conductive layer, and electrically connected to said first electrode;
   wherein said third conductive layer comprises a first layer that contains a constituent element of said insulating layer formed on said insulating layer and said second conductive layer, and a second layer comprised of a carbon formed on said first layer.

6. The electric double layer capacitor according to claim 5, wherein said insulating layer is comprised of a ceramic, and said first layer is comprised of a material with a linear coefficient of expansion that ranges between about $2\times10^{-6}/°$ C. and $7.3\times10^{-6}/°$ C.

7. The electric double layer capacitor according to claim 6, wherein said first layer is formed by a spattering method.

8. An electric double layer capacitor comprising;
   a container having a lid and a containing portion comprised of an insulating material,
   an electric double layer capacitor element having a first electrode and a second electrode arranged to face each other inside of said container through a separator; and
   an electrolytic solution located in said container;
   wherein said containing portion contains a first conductive layer formed on an inner face of said containing portion;
   an insulating layer formed to cover said first conductive layer;
   an opening portion that reaches from a surface of said insulating layer to said first conductive layer;
   a second conductive layer formed to cover an inside of said opening portion; and
   a third conductive layer formed onto said insulating layer and said second conductive layer and electrically connected to said first electrode;
   wherein said third conductive layer comprises a first layer, which contains an aluminum, and is formed on said insulating layer and said second conductive layer, and a second layer comprised of carbon formed on said first layer.

9. The electric double layer capacitor according to any of claims 1, 2, 5 or 8, wherein said first layer is formed by a spattering method.

* * * * *